United States Patent
Han et al.

(10) Patent No.: US 12,457,079 B2
(45) Date of Patent: Oct. 28, 2025

(54) INFORMATION INDICATION METHOD AND APPARATUS

(71) Applicant: HUAWEI TECHNOLOGIES CO., LTD., Shenzhen (CN)

(72) Inventors: Xiao Han, Shenzhen (CN); Wei Lin, Shenzhen (CN); Jian Yu, Shenzhen (CN); Cailian Deng, Chengdu (CN); Rui Du, Shenzhen (CN); Xuming Fang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 466 days.

(21) Appl. No.: 17/342,771

(22) Filed: Jun. 9, 2021

(65) Prior Publication Data
US 2022/0006591 A1   Jan. 6, 2022

Related U.S. Application Data

(63) Continuation of application No. PCT/CN2019/122277, filed on Nov. 30, 2019.

(30) Foreign Application Priority Data

Dec. 10, 2018   (CN) .......................... 201811505883.6

(51) Int. Cl.
*H04L 5/00*   (2006.01)
*G01S 7/41*   (2006.01)
*H04W 52/02*   (2009.01)

(52) U.S. Cl.
CPC .............. *H04L 5/0053* (2013.01); *G01S 7/41* (2013.01); *H04W 52/0225* (2013.01); *Y02D 30/70* (2020.08)

(58) Field of Classification Search
CPC ......... H04L 5/0053; G01S 7/41; G01S 13/87; G01S 7/006; G01S 7/411; H04W 52/0225; H04W 52/02; Y02D 30/70
See application file for complete search history.

(56) References Cited

U.S. PATENT DOCUMENTS 7,433,383 B2 * 10/2008 Lemberger ............ H04W 24/00
                                                                    375/150
2013/0039298 A1   2/2013 Park et al.
(Continued)

FOREIGN PATENT DOCUMENTS

| CN | 1926815 A | 3/2007 |
| CN | 104660470 A | 5/2015 |

(Continued)

OTHER PUBLICATIONS

R4-1811058, Huawei, "MU for extreme temperature tests," 3GPP TSG-RAN WG4 Meeting RAN4#88, Gothenburg, Sweden, Aug. 20-24, 2018; 7 total pages.

(Continued)

*Primary Examiner* — Pao Sinkantarakorn
(74) *Attorney, Agent, or Firm* — Rimon PC

(57) ABSTRACT

Embodiments of this application relate to the communications field, and in particular, to an information indication method and apparatus in the communications field. The embodiments of this application include: generating a PPDU including radar indication information, where the radar indication information is used to indicate that the PPDU is a PPDU used for radar testing, and transmitting the PPDU. According to the method provided in the embodiments of this application, the transmit end explicitly indicates that the PPDU is a PPDU used for radar testing rather than a PPDU used for communication between communications devices. When a receive end receives the PPDU, the receive end no (Continued)

longer monitors a channel, thereby reducing power consumption of the receive end.

3 Claims, 4 Drawing Sheets

(56) References Cited

U.S. PATENT DOCUMENTS

| | | | |
|---|---|---|---|
| 2016/0178743 A1 | 6/2016 | Seo et al. | |
| 2016/0315675 A1* | 10/2016 | Seok | H04B 7/0452 |
| 2017/0094651 A1 | 3/2017 | Green et al. | |
| 2018/0152918 A1 | 5/2018 | Green et al. | |
| 2018/0242182 A1 | 8/2018 | Rashid et al. | |
| 2019/0037498 A1* | 1/2019 | Tseng | H04W 72/046 |

FOREIGN PATENT DOCUMENTS

| | | |
|---|---|---|
| CN | 105592551 A | 5/2016 |
| CN | 107409324 A | 11/2017 |
| WO | 2015017463 A2 | 2/2015 |

OTHER PUBLICATIONS

3GPP TR 38.889 V1.0.0 (Nov. 2018), 3rd Generation Partnership Project; Technical Specification Group Radio Access Network; Study on NR-based Access to Unlicensed Spectrum; (Release 16); 120 total pages.

R1-150156, ZTE, "Analysis on potential issues and solutions for LAA UL transmission," 3GPP TSG RAN WG1 Meeting #80, Athens, Greece, Feb. 9-13, 2015; 6 total pages.

ZTE, Sanechips et al., "Overview of possible NR-U impact to RAN2", 3GPP TSG-RAN WG2 Meeting #101bis, Sanya, China, Apr. 16-20, 2018, R2-1804348, total: 7 pages.

IEEE P802.11ay /D2.0, Jul. 2018, Draft Standard for Information Technology-10 Telecommunications and Information Exchange 11 Between Systems—Local and Metropolitan Area 12 Networks—Specific Requirements—Part 11: Wireless 13 LAN Medium Access Control (MAC) and Physical Layer 14 (PHY) Specifications-15, Amendment 7: Enhanced throughput for operation in 16 license-exempt bands above 45 GHZ, 673 pages.

IEEE Std 802.11ad TM-2012, Part 11: Wireless LAN Medium Access Control (MAC) and Physical Layer (PHY) Specifications, Amendment 3: Enhancements for Very High Throughput in the 60 GHz Band, IEEE Computer Society, dated Oct. 19, 2012, total 628 pages.

* cited by examiner

| Preamble | Signaling header | Data | Automatic gain control subfield | Training subfield |

FIG. 3

| Field name | Bit | Description |
|---|---|---|
| Differential Encoder Initialization | 0 | Used to initialize differential encoding, and may be set to any value. |
| Scrambler Initialization | 1–4 | Used to initialize bits X1–X4 of a scrambling shift register. |
| Length | 5–14 | Indicates a length of a data byte in a PSDU, within a range of 14 to 1023. |
| Packet Type | 15 | Corresponds to a PPDU-TYPE parameter (representing BRP-RX/BRP-TX PPDU) of TXVECTOR. When a training length field is 0, this field represents a reserved bit. |
| Training Length | 16–20 | Corresponds to a TRN-LEN parameter of TXVECTOR, and used to indicate a length of a training field. |
| Turnaround | 21 | Includes a copy of TURNAROUND parameter of TXVECTOR. |
| Reserved bits | 22–23 | – |
| Header check sequence | 24–39 | Used for header check. |

FIG. 4

INFORMATION INDICATION METHOD AND APPARATUS

CROSS-REFERENCE TO RELATED APPLICATIONS

This application is a continuation of International Application No. PCT/CN2019/122277, filed on Nov. 30, 2019, which claims priority to Chinese Patent Application No. 201811505883.6, filed on Dec. 10, 2018. The disclosures of the aforementioned applications are hereby incorporated by reference in their entireties.

TECHNICAL FIELD

Embodiments of this application relate to the communications field, and in particular, to an information indication method and apparatus in the communications field.

BACKGROUND

Radar, is an acronym of "radio detection and ranging", that is, finding targets and determining, through measurement, spatial positions of the targets by using a radio method. Therefore, radar is also referred to as "radiolocation". A radar device is an electronic device that detects a target by using an electromagnetic wave. The radar device emits the electromagnetic wave to irradiate the target and receives an echo wave of the electromagnetic wave, to obtain information such as a distance between the target and a point at which the electromagnetic wave is emitted, a distance change rate (a radial velocity), azimuth, and a height.

If a communications device has a radar function, when the communications device is to send a radar data packet, another communications device proximate the communications device does not know that the communications device is sending a radar data packet. Therefore, the communications device proximate the communications device still continues to monitor a channel, consequently causing a waste of power consumption.

SUMMARY

Embodiments of this application provide an information indication method and apparatus, to reduce power consumption of a communications device.

According to a first aspect, an embodiment of this application provides an information indication method, including:

generating a PLCP Protocol Data Unit (PPDU) including radar indication information, where the radar indication information is used to indicate that the PPDU is a PPDU used for radar testing, and transmitting the PPDU.

In other words, a transmit end generates the PPDU including the radar indication information, where the radar indication information is used to indicate that the PPDU carries a radar signal, or the radar indication information is used to indicate that a time period indicated by a Duration field in the PPDU is used for transmission of a radar signal, or the radar indication information is used to indicate that a TXOP protected/set in the PPDU is used for transmission of a radar signal.

According to the method provided in this embodiment of this application, the transmit end explicitly indicates that the PPDU is a PPDU used for radar testing rather than a PPDU used for communication between communications devices. When a receive end receives the PPDU, the receive end no longer monitors a channel, thereby reducing power consumption of the receive end.

In a first possible implementation of the first aspect, the radar indication information is located in a PHY header in the PPDU. Specifically, the radar indication information includes a Turnaround field with a value of 0 and a Scrambler Initialization field with a value of any one of the following values, where the following values include 101R, 100R, 10R1, 10R0, 111R, 110R, 11R0, and 11R0, and R represents a reserved bit.

In a second possible implementation of the first aspect, the radar indication information is located in a PHY header in the PPDU. Specifically, the radar indication information includes a Turnaround field with a value of 0 and a Scrambler Initialization field with a value of any one of the following values, where the following values include 1010, 1011, 1000, 1001, 1100, 1101, 1110, and 1111.

In a third possible implementation of the first aspect, the radar indication information is located at a MAC layer in the PPDU. Specifically, the radar indication information includes a Type field with a value of 11 and a Subtype field with a value of any one of the following values, where the following values include 0010, 0011, 0100, 0101, 0110, 0111, 1000, 1001, 1010, 1011, 1100, 1101, 1110, and 1111.

In a fourth possible implementation of the first aspect, the radar indication information is located at a MAC layer in the PPDU. Specifically, the radar indication information includes a Type field with a value of 00, a Subtype field with a value of 1101 or 1110, and a Category field with a value of any one of all values from decimal 30 to decimal 125.

In a fifth possible implementation of the first aspect, the radar indication information includes a Type field with a value of 00, a Subtype field with a value of 1101 or 1110, a Category field with a value of 0, and an Action field with a value of any one of all values from decimal 5 to decimal 255.

According to a second aspect, an embodiment of this application provides an information indication method, including:

receiving a PPDU including radar indication information, where the radar indication information is used to indicate that the PPDU is a PPDU used for radar testing; and determining, based on the radar indication information, that the PPDU is a PPDU used for radar testing.

In other words, a receive end receives the PPDU including the radar indication information, where the radar indication information is used to indicate that the PPDU carries a radar signal, or the radar indication information is used to indicate that a time period indicated by a Duration field in the PPDU is used for transmission of a radar signal, or the radar indication information is used to indicate that a TXOP protected/set in the PPDU is used for transmission of a radar signal.

According to the method provided in this embodiment of this application, the receive end receives the PPDU including the radar indication information, and determines that the PPDU is a PPDU used for radar testing rather than a PPDU used for communication between communications devices. In this case, the receive end no longer monitors a channel, thereby reducing power consumption of the receive end.

In a first possible implementation of the second aspect, the radar indication information is located in a PHY header in the PPDU. Specifically, the radar indication information includes a Turnaround field with a value of 0 and a Scrambler Initialization field with a value of any one of the following values, where the following values include 101R, 100R, 10R1, 10R0, 111R, 110R, 11R0, and 11R0, and R represents a reserved bit.

In a second possible implementation of the second aspect, the radar indication information is located in a PHY header in the PPDU. Specifically, the radar indication information includes a Turnaround field with a value of 0 and a Scrambler Initialization field with a value of any one of the following values, where the following values include 1010, 1011, 1000, 1001, 1100, 1101, 1110, and 1111.

In a third possible implementation of the second aspect, the radar indication information is located at a MAC layer in the PPDU. Specifically, the radar indication information includes a Type field with a value of 11 and a Subtype field with a value of any one of the following values, where the following values include 0010, 0011, 0100, 0101, 0110, 0111, 1000, 1001, 1010, 1011, 1100, 1101, 1110, and 1111.

In a fourth possible implementation of the second aspect, the radar indication information is located at a MAC layer in the PPDU. Specifically, the radar indication information includes a Type field with a value of 00, a Subtype field with a value of 1101 or 1110, and a Category field with a value of any one of all values from decimal 30 to decimal 125.

In a fifth possible implementation of the second aspect, the radar indication information includes a Type field with a value of 00, a Subtype field with a value of 1101 or 1110, a Category field with a value of 0, and an Action field with a value of any one of all values from decimal 5 to decimal 255.

According to a third aspect, an embodiment of this application provides an information indication apparatus, applied to a transmit end and including:
 a processing unit, configured to generate a PPDU including radar indication information, where the radar indication information is used to indicate that the PPDU is a PPDU used for radar testing; and
 a transceiver unit, configured to transmit the PPDU.

In this embodiment of this application, the transmit end explicitly indicates that the PPDU is a PPDU used for radar testing rather than a PPDU used for communication between communications devices. When a receive end receives the PPDU, the receive end no longer monitors a channel, thereby reducing power consumption of the receive end.

In a first possible implementation of the third aspect, the radar indication information is located in a PHY header in the PPDU. Specifically, the radar indication information includes a Turnaround field with a value of 0 and a Scrambler Initialization field with a value of any one of the following values, where the following values include 101R, 100R, 10R1, 10R0, 111R, 110R, 11R0, and 11R0, and R represents a reserved bit.

In a second possible implementation of the third aspect, the radar indication information is located in a PHY header in the PPDU. Specifically, the radar indication information includes a Turnaround field with a value of 0 and a Scrambler Initialization field with a value of any one of the following values, where the following values include 1010, 1011, 1000, 1001, 1100, 1101, 1110, and 1111.

In a third possible implementation of the third aspect, the radar indication information is located at a MAC layer in the PPDU. Specifically, the radar indication information includes a Type field with a value of 11 and a Subtype field with a value of any one of the following values, where the following values include 0010, 0011, 0100, 0101, 0110, 0111, 1000, 1001, 1010, 1011, 1100, 1101, 1110, and 1111.

In a fourth possible implementation of the third aspect, the radar indication information is located at a MAC layer in the PPDU. Specifically, the radar indication information includes a Type field with a value of 00, a Subtype field with a value of 1101 or 1110, and a Category field with a value of any one of all values from decimal 30 to decimal 125.

In a fifth possible implementation of the third aspect, the radar indication information includes a Type field with a value of 00, a Subtype field with a value of 1101 or 1110, a Category field with a value of 0, and an Action field with a value of any one of all values from decimal 5 to decimal 255.

According to a fourth aspect, an embodiment of this application provides an information indication apparatus, applied to a receive end and including:
 a transceiver unit, configured to receive a PPDU including radar indication information, where the radar indication information is used to indicate that the PPDU is a PPDU used for radar testing; and
 a processing unit, configured to determine, based on the radar indication information, that the PPDU is a PPDU used for radar testing.

In this embodiment of this application, the receive end receives the PPDU including the radar indication information, and determines that the PPDU is a PPDU used for radar testing rather than a PPDU used for communication between communications devices. In this case, the receive end no longer monitors a channel, thereby reducing power consumption of the receive end.

In a first possible implementation of the fourth aspect, the radar indication information is located in a PHY header in the PPDU. Specifically, the radar indication information includes a Turnaround field with a value of 0 and a Scrambler Initialization field with a value of any one of the following values, where the following values include 101R, 100R, 10R1, 10R0, 111R, 110R, 11R0, and 11R0, and R represents a reserved bit.

In a second possible implementation of the fourth aspect, the radar indication information is located in a PHY header in the PPDU. Specifically, the radar indication information includes a Turnaround field with a value of 0 and a Scrambler Initialization field with a value of any one of the following values, where the following values include 1010, 1011, 1000, 1001, 1100, 1101, 1110, and 1111.

In a third possible implementation of the fourth aspect, the radar indication information is located at a MAC layer in the PPDU. Specifically, the radar indication information includes a Type field with a value of 11 and a Subtype field with a value of any one of the following values, where the following values include 0010, 0011, 0100, 0101, 0110, 0111, 1000, 1001, 1010, 1011, 1100, 1101, 1110, and 1111.

In a fourth possible implementation of the fourth aspect, the radar indication information is located at a MAC layer in the PPDU. Specifically, the radar indication information includes a Type field with a value of 00, a Subtype field with a value of 1101 or 1110, and a Category field with a value of any one of all values from decimal 30 to decimal 125.

In a fifth possible implementation of the fourth aspect, the radar indication information includes a Type field with a value of 00, a Subtype field with a value of 1101 or 1110, a Category field with a value of 0, and an Action field with a value of any one of all values from decimal 5 to decimal 255.

According to a fifth aspect, an embodiment of this application provides an information indication apparatus, including a processor and a transceiver. The processor and the transceiver communicate with each other through an internal connection. The processor is configured to perform a processing step in any implementation of the first aspect, and the transceiver is configured to perform a transceiving step in any implementation of the first aspect.

According to a sixth aspect, an embodiment of this application provides an information indication apparatus, including a processor and a transceiver. The processor and the transceiver communicate with each other through an internal connection. The processor is configured to perform a processing step in any implementation of the second aspect, and the transceiver is configured to perform a transceiving step in any implementation of the second aspect.

According to a seventh aspect, an embodiment of this application provides an information indication apparatus, including a processing circuit and an output interface. The processing circuit and the output interface communicate with each other through an internal connection. The processing circuit is configured to perform a step of generating a PPDU in any implementation of the first aspect, and the output interface is configured to output the PPDU.

According to an eighth aspect, an embodiment of this application provides an information indication apparatus, including a processing circuit and an input interface. The processing circuit and the input interface communicate with each other through an internal connection. The input interface is configured to input the PPDU, and the processing circuit is configured to perform a determining step in any implementation of the second aspect.

According to a ninth aspect, an embodiment of this application provides a computer-readable storage medium, configured to store a computer program. The computer program includes instructions used to perform any implementation of the first aspect.

According to a tenth aspect, an embodiment of this application provides a computer readable storage medium, configured to store a computer program. The computer program includes instructions used to perform any implementation of the second aspect.

According to an eleventh aspect, an embodiment of this application provides a computer program. The computer program includes instructions used to perform any implementation of the first aspect.

According to a twelfth aspect, an embodiment of this application provides a computer program. The computer program includes instructions used to perform any implementation of the second aspect.

BRIEF DESCRIPTION OF DRAWINGS

FIG. 3 shows a structure of a PPDU according to an embodiment of this application;

FIG. 4 further shows a structure of a PHY header part;

FIG. 7 shows a structure of an information indication apparatus according to an embodiment of this application.

DESCRIPTION OF EMBODIMENTS

The following describes the technical solutions in the embodiments of this application with reference to the accompanying drawings in the embodiments of this application.

It should be understood that, the technical solutions of the embodiments of this application may be applied to various communications systems, such as: a Wi-Fi wireless communications system, a global system for mobile communications (GSM), a code division multiple access (CDMA) system, a wideband code division multiple access (WCDMA) system, a general packet radio service (GPRS) system, a long term evolution (LTE) system, a universal mobile telecommunications system (UMTS), a worldwide interoperability for microwave access (WiMAX) communications system, a future 5G communications system, or various other wireless communications systems using radio access technology, and the like.

Figure 1:
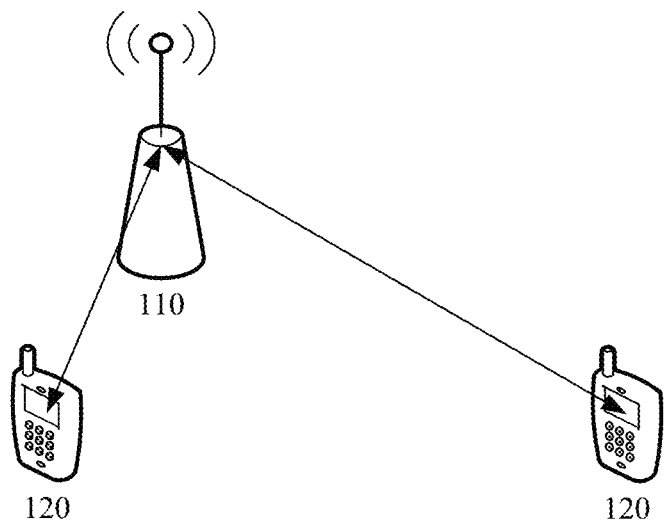
FIG. 1 shows a communications system 100 that is applied to an embodiment of this application.

FIG. 1 shows a communications system 100 that is applied to an embodiment of this application. The communications system 100 may include at least one network device 110. The network device 110 may be a device, for example, an access point AP, a base station, or a base station controller, that communicates with a terminal device. Each network device 110 may provide communication coverage for a specific geographic area, and may communicate with a terminal device (for example, User Equipment (UE)) located in the coverage area (such as a cell coverage area). The network device 110 may be a base transceiver station (BTS) in a GSM system or a code division multiple access (CDMA) system, a NodeB (NB) in a WCDMA system, an evolved NodeB (eNB or eNodeB) in an LTE system, or a radio controller in a cloud radio access network (CRAN). Alternatively, the network device may be a relay station, an access point, a vehicle-mounted device, a wearable device, a network side device in a future 5G network, a network device in a future evolved public land mobile network (PLMN), or the like.

The wireless communications system 100 further includes at least one terminal device 120 located in the coverage area of the network device 110. The terminal device 120 may be mobile or fixed. The terminal device 120 may be an access terminal, user equipment (UE), a subscriber unit, a subscriber station, a mobile station, a mobile console, a remote station, a remote terminal, a mobile device, a user terminal, a terminal, a wireless communications device, a user agent, a user apparatus, or the like. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile network (PLMN), or the like.

In this embodiment of this application, the network device 110 and the terminal device 120 in FIG. 1 have a wireless communication capability and a radar function. Radar technology is also referred to as "radiolocation" technology, as noted above. Specifically, a device with the radar function emits an electromagnetic wave to irradiate a target and receives an echo wave of the electromagnetic wave, to obtain information such as a distance between the target and a point at which the electromagnetic wave is emitted, a distance change rate (a radial velocity), azimuth, and a height.

The following describes a specific solution in the embodiments of this application.

If a communications device has the radar function, when the communications device is to send a radar data packet, another communications device in a surrounding area of the communications device does not know that the communications device is sending a radar data packet. Therefore, the other communications device that does not want to receive a radar signal still continues to monitor a channel, consequently causing a waste of power consumption for the surrounding communications device that does not need to receive a radar signal.

The embodiments of this application provide an information indication method and apparatus. A transmit end explicitly indicates that a PPDU is a PPDU used for radar testing. When a receive end receives the PPDU that includes indication information, if the receive end does not need to receive a radar signal, the receive end may choose to no longer monitor a channel or no longer receive a packet, or may no longer monitor a channel or no longer receive a packet within a time period indicated by a Duration field in the PPDU, thereby reducing power consumption of the receive end.

Figure 2:
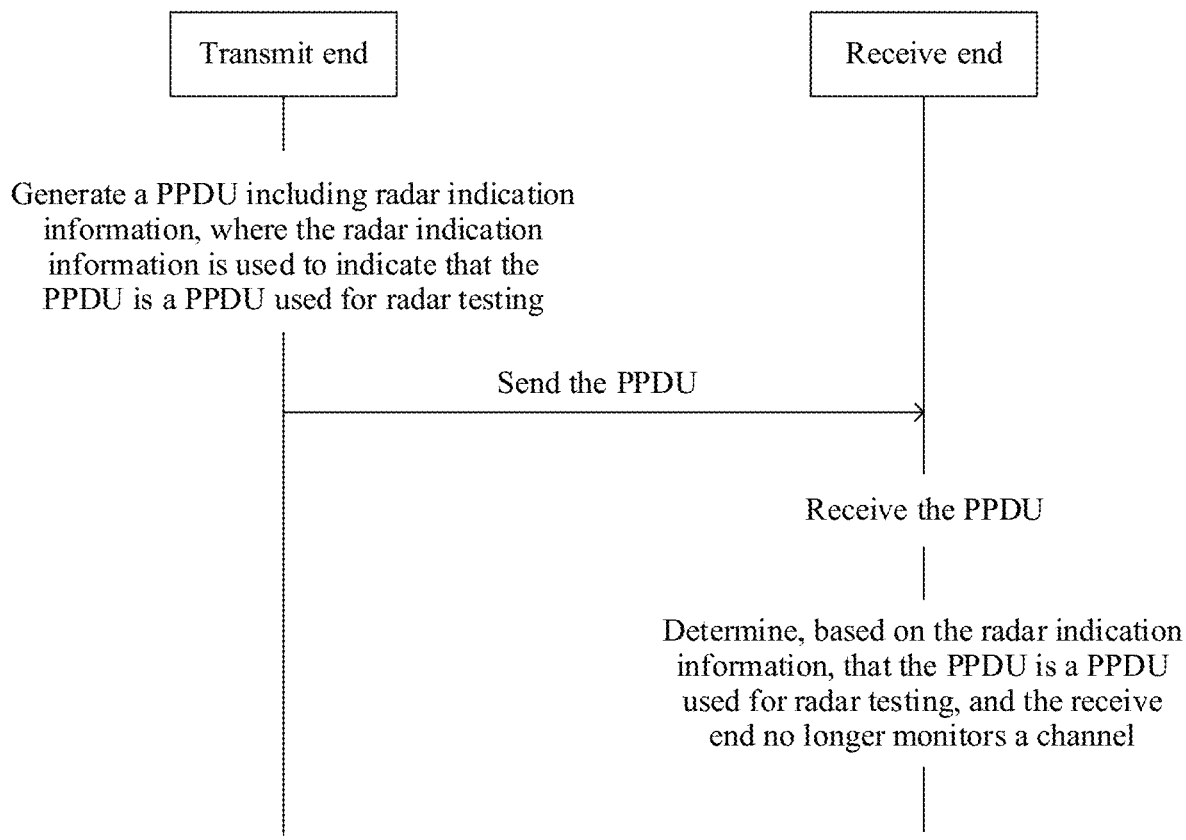
FIG. 2 shows an information indication method according to an embodiment of this application.

FIG. 2 shows an information indication method according to an embodiment of this application. As shown in FIG. 2, the information indication method includes the following steps.

S201: A transmit end generates a PPDU including radar indication information, where the radar indication information is used to indicate that the PPDU is a PPDU used for radar testing.

In S201, the radar indication information is used to indicate that the PPDU is a PPDU used for radar testing rather than a PPDU sent to another communications device for communication.

In other words, the radar indication information is used to indicate that the PPDU carries a radar signal, or the radar indication information is used to indicate that a time period indicated by a Duration field in the PPDU is used for transmission of a radar signal, or the radar indication information is used to indicate that a TXOP protected/set in the PPDU is used for transmission of a radar signal.

In S201, the radar indication information can be located in a PHY header in the PPDU, a MAC header in the PPDU, or a MAC payload in the PPDU.

When the radar indication information is located in the PHY header in the PPDU, the radar indication information includes a Turnaround field with a value of 0 and a Scrambler Initialization field with a value of any one of the following values, where the following values include 101R, 100R, 10R1, 10R0, 111R, 110R, 11R0, and 11R0, and R represents a reserved bit.

When the radar indication information is located in the PHY header in the PPDU, the radar indication information alternatively includes a Turnaround field with a value of 0 and a Scrambler Initialization field with a value of any one of the following values, where the following values include 1010, 1011, 1000, 1001, 1100, 1101, 1110, and 1111.

When a receive end receives the PPDU, and reads that the Turnaround field is 0 and the Scrambler Initialization field is any one of the foregoing values in the PHY header in the PPDU, the receive end determines the PPDU as a PPDU used for radar testing rather than a PPDU sent to the receive end for communication. In this case, the receive end no longer monitors a channel, thereby reducing power consumption of the receive end.

When the radar indication information is located at a MAC layer in the PPDU, the radar indication information includes a Type field with a value of 11 and a Subtype field with a value of any one of the following values, where the following values include 0010, 0011, 0100, 0101, 0110, 0111, 1000, 1001, 1010, 1011, 1100, 1101, 1110, and 1111.

When the radar indication information is located at a MAC layer in the PPDU, the radar indication information includes a Type field with a value of 00, a Subtype field with a value of 1101 or 1110, and a Category field with a value of any one of all values from decimal 30 to decimal 125. Herein, decimal 30 to decimal 125 indicates all values from decimal 30 to decimal 125 sequentially in ascending order.

When the radar indication information is located at a MAC layer in the PPDU, the radar indication information alternatively includes a Type field with a value of 00, a Subtype field with a value of 1101 or 1110, a Category field with a value of 0, and an Action field with a value of any one of all values from decimal 5 to decimal 255. Herein, decimal 5 to decimal 255 indicates all values from decimal 5 to decimal 255 sequentially in ascending order.

When the receive end receives the PPDU and reads any one of the foregoing pieces of radar indication information, the receive end determines the PPDU as a PPDU used for radar testing rather than a PPDU sent to the receive end for communication. In this case, if the receive end does not want to receive the radar signal, the receive end may no longer monitor a channel or no longer receive a packet, or may no longer monitor a channel or no longer receive a packet within the time period indicated by the Duration field in the PPDU, thereby reducing power consumption of the receive end.

For descriptions of a structure of a PHY layer in the PPDU and a structure of the MAC layer in the PPDU, refer to a last part in this embodiment of this application.

In S202, the transmit end transmits the PPDU that includes the radar indication information in S201.

In S203, the receive end receives the PPDU that includes the radar indication information in S202.

In S204, the receive end determines, based on the radar indication information, that the PPDU is a PPDU used for radar testing, and the receive end no longer monitors a channel.

The following describes the structure of the PHY layer in the PPDU and the structure of the MAC layer in the PPDU in this embodiment of this application.

FIG. 3 shows a data structure of a PPDU according to an embodiment of this application. As shown in FIG. 3, the PPDU includes a Preamble part, a Header part, and a Data part. Optionally, the PPDU further includes an AGC subfield and a TRN subfield.

FIG. 4 further shows a data structure of a PHY header part. As shown in FIG. 4, the PHY header part includes a Differential Encoder Initialization field, a Scrambler Initialization field, a Length field, a Packet Type field, a Training Length field, a Turnaround field, and an HCS field.

Figure 5:
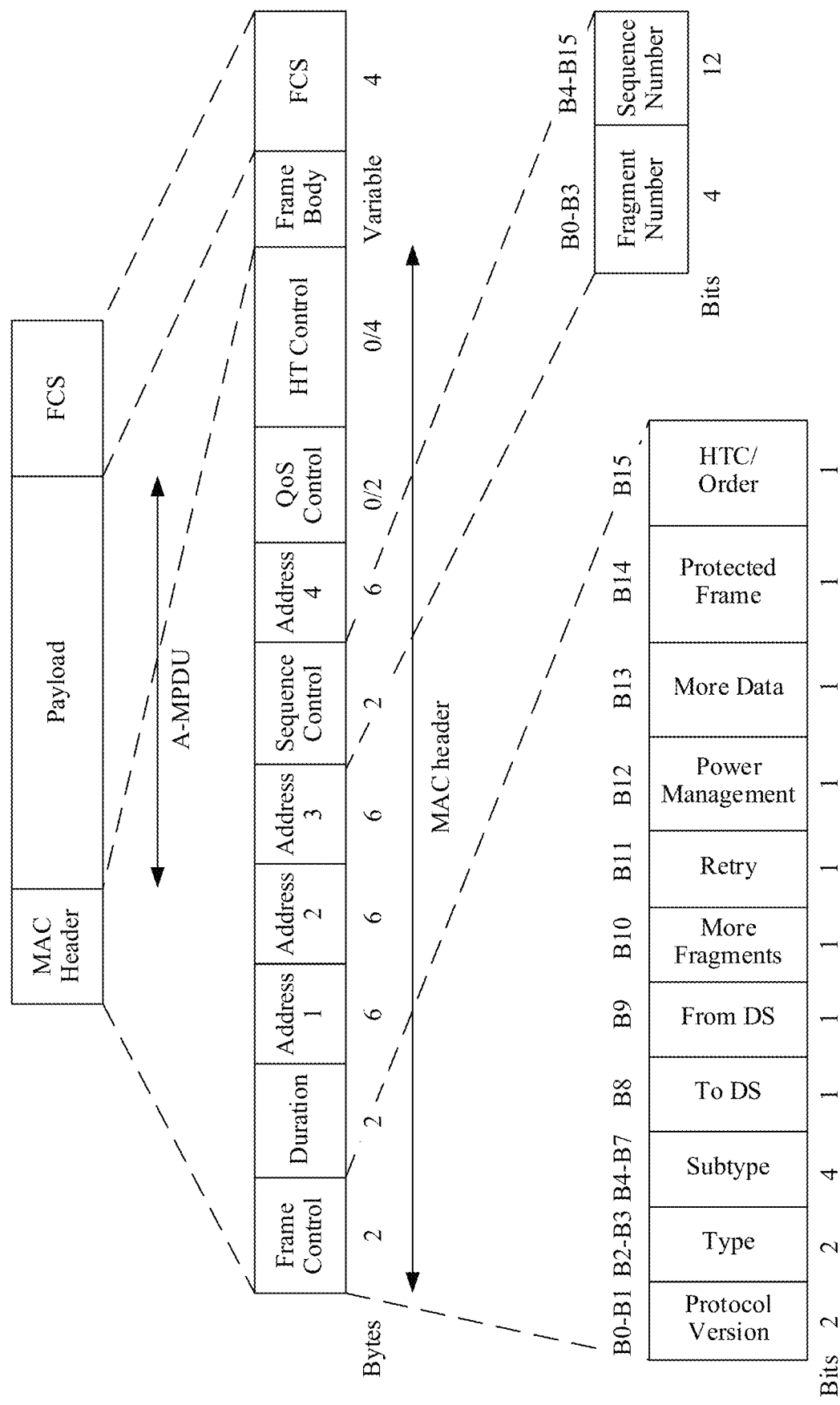
FIG. 5 shows a layer structure of an MPDU in a PPDU according to an embodiment of this application.

FIG. 5 shows a layer structure of an MPDU in a PPDU according to an embodiment of this application. As shown in FIG. 5, the MPDU includes a MAC header part, a MAC payload part, and an FCS part. Further, the MAC header part includes a Frame Control field, a Duration field, an Address field, a Sequence Control field, a QoS Control field, and an HT Control field. Further, the Frame Control field includes a Protocol Version field, a Type field, a Subtype field, a To DS field, a From DS field, a More Fragments field, a Retry field, a Power Management field, a More Data field, a Protected Frame field, and an HTC/Order field.

Figure 6:
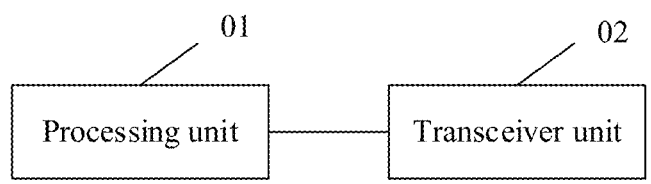
FIG. 6 shows fields included in a MAC payload part.

Further, when the value of the Type field is 00, and the value of the Subtype field is 1101 or 1110 in the MAC header part in FIG. 5, the MAC payload part in FIG. 5 includes fields shown in FIG. 6, including a Category field, an Action field, and an Information Elements field. In this case, the radar indication information includes the Type field with the value of 00, the Subtype field with the value of 1101 or 1110, and the Category field with the value of any one of all values from decimal 30 to decimal 125; or the radar indication information includes the Type field with the value of 00, the Subtype field with the value of 1101 or 1110, the Category field with the value of 0, and the Action field with the value of any one of all values from decimal 5 to decimal 255.

It should be understood that in this embodiment of this application, "a value of XX" all indicates a binary value of XX. Other number systems, other than a binary system, can also be used in the embodiments. Conversion between number systems is well known, and is not described in detail in this embodiment of this application.

It should be understood that a reserved bit at any position in the PPDU may be used as an indicator bit in this embodiment of this application. The foregoing is merely an example, and another case is not described in detail in this application.

The PPDU in this embodiment of this application includes an SSW frame, a Short SSW frame, a CTS-to-self frame, a QoS-Null frame, and an NDP frame.

In addition, an embodiment of this application further provides a second information indication method. If an RA and a TA are the same in a PPDU, it is considered that the PPDU is a PPDU used for radar testing.

Certainly, in the first information indication method provided in the embodiment of this application, an RA and a TA that are of the PPDU may be alternatively set to be the same.

In addition, an embodiment of this application further provides a third information indication method. A difference between the third information indication method and the first information indication method is as follows.

In the first information indication method, a transmit end generates a PPDU including radar indication information, where the radar indication information is used to indicate that the PPDU is a PPDU used for radar testing; or the radar indication information is used to indicate that the PPDU carries a radar signal; or the radar indication information is used to indicate that a time period indicated by a Duration field in the PPDU is used for transmission of a radar signal; or the radar indication information is used to indicate that a TXOP protected/set in the PPDU is used for transmission of a radar signal.

In the third information indication method, a transmit end generates a PPDU including first radar indication information, where the first radar indication information is used to indicate that the PPDU is a PPDU used for radar testing; or the first radar indication information is used to indicate that the PPDU carries a radar signal. On this basis, the PPDU further includes second radar indication information, where the second radar indication information is used to indicate that a time period indicated by a Duration field in the PPDU is used for transmission of a radar signal; or the second radar indication information is used to indicate that a TXOP protected/set in the PPDU is used for transmission of a radar signal.

In the third information indication method, two indicator bits may be used to separately indicate the first radar indication information and the second radar indication information, or one indicator bit may be used to indicate both the first radar indication information and the second radar indication information.

In the various information indication methods mentioned above, a radar signal may be a TRN at the end, or may be a signal in a preamble, for example, an STF or a CEF.

FIG. 7 shows a structure of an information indication apparatus according to an embodiment of this application.

An embodiment of this application provides an information indication apparatus. It should be understood that the information indication apparatus in this embodiment of this application is applied to a transmit end, and has any function of the transmit end in the foregoing methods.

As shown in FIG. 7, an information indication apparatus is applied to a transmit end and includes:
  a processing unit 01, configured to generate a PPDU including radar indication information, where the radar indication information is used to indicate that the PPDU is a PPDU used for radar testing; and
  a transceiver unit 02, configured to transmit the PPDU In this embodiment of this application, the transmit end explicitly indicates that the PPDU is a PPDU used for radar testing rather than a PPDU used for communication between communications devices. When a receive end receives the PPDU, the receive end no longer monitors a channel, thereby reducing power consumption of the receive end.

The information indication apparatus in this embodiment of this application is applied to the transmit end, and has any function of the transmit end in the foregoing methods. Details are not described herein again.

An embodiment of this application further provides another information indication apparatus. It should be understood that the information indication apparatus in this embodiment of this application is applied to a receive end, and has any function of the receive end in the foregoing methods.

As shown in FIG. 7, an information indication apparatus is applied to a receive end and includes:
  a transceiver unit 02, configured to receive a PPDU including radar indication information, where the radar indication information is used to indicate that the PPDU is a PPDU used for radar testing; and
  a processing unit 01, configured to determine, based on the radar indication information, that the PPDU is a PPDU used for radar testing.

In this embodiment of this application, the receive end receives the PPDU including the radar indication information, and determines that the PPDU is a PPDU used for radar testing rather than a PPDU used for communication between communications devices. In this case, the receive end no longer monitors a channel, thereby reducing power consumption of the receive end.

The information indication apparatus in this embodiment of this application is applied to the receive end, and has any function of the receive end in the foregoing methods. Details are not described herein again.

The information indication apparatuses provided in the embodiments of this application may be implemented in a plurality of product forms. For example, the information indication apparatus may be configured as a general-purpose processing system; for example, the information indication apparatus may be implemented by a general bus architecture; for example, the information indication apparatus may be implemented by an ASIC (application-specific integrated circuit); or the like. The following provides several possible product forms of the information indication apparatus in the embodiments of this application. It should be understood that the following product forms are merely examples, and do not limit that product forms of the information indication apparatuses in the embodiments of this application is limited thereto.

Figure 8:
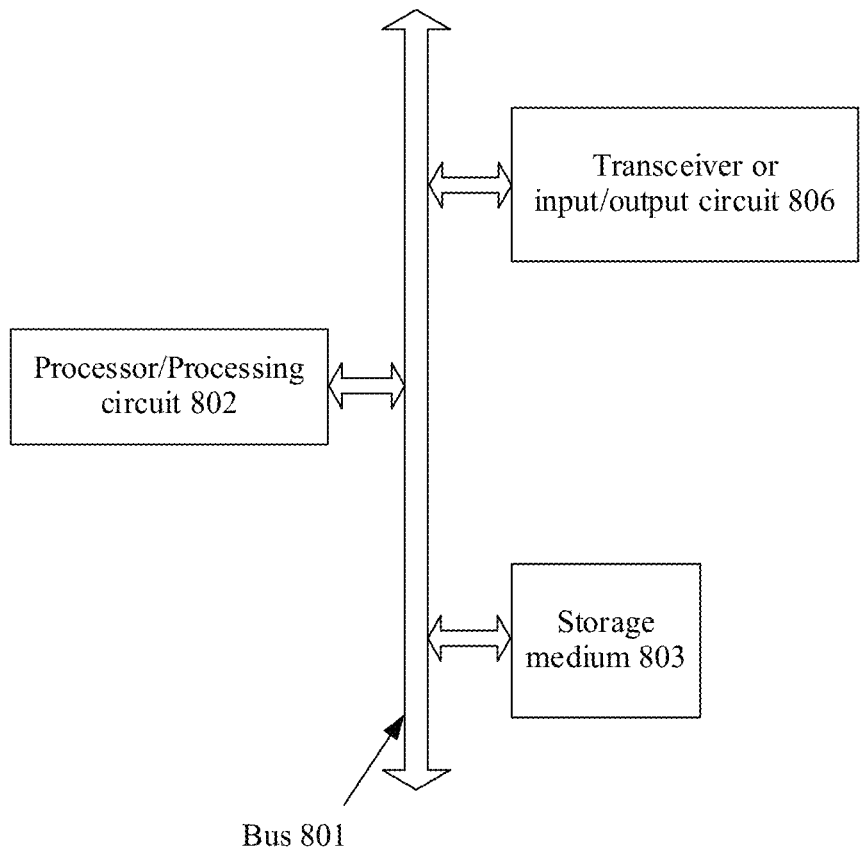
FIG. 8 shows a structure of a possible product form of an information indication apparatus according to an embodiment of this application.

FIG. 8 shows a structure of a possible product form of an information indication apparatus according to an embodiment of this application. The following uses only an information indication apparatus applied to a transmit end as an example for description. An information indication apparatus applied to a receive end is similar to the information indication apparatus applied to the transmit end, and details are not described below again.

As a possible product form, the information indication apparatus applied to the transmit end may be an information indication device or an information indication board. The information indication device or the information indication board includes a processor 802 and a transceiver 806. Optionally, the information indication device or the information indication board may further include a storage medium 803. The processor 802 is configured to perform a processing step of the transmit end in the foregoing methods. The transceiver 806 is configured to perform a transceiving step of the transmit end in the foregoing methods. The storage medium 803 is configured to store instructions executed by the processor 802.

As another possible product form, the information indication apparatus applied to the transmit end may be alternatively implemented by a general-purpose processor, which is commonly known as a "chip". The general-purpose processor includes a processing circuit and an output interface. The processing circuit and the output interface communicate with each other through an internal connection. The processing circuit is configured to perform the step of generating a PPDU in the foregoing methods, and the output interface is configured to output the PPDU. Optionally, the general-purpose processor may further include a storage medium 803. The storage medium 803 is configured to store instructions executed by the processor circuit 802.

As another possible product form, the information indication apparatus applied to the transmit end may be alternatively implemented by using the following: one or more FPGAs (field programmable gate array), a PLD (programmable logic device), a controller, a state machine, gate logic, a discrete hardware component, any other suitable circuit, or any combination of circuits capable of performing various functions described throughout this application.

It should be understood that the term "and/or" in this specification describes only an association relationship between associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraints of the technical solutions. A person of ordinary skill in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments in this application.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of this application, but are not intended to limit the protection scope of this application. Any modification or replacement readily figured out by a person skilled in the art within the technical scope disclosed in this application shall fall within the protection scope of this application. Therefore, the protection scope of this application shall be subject to the protection scope of the claims.

What is claimed is:
1. An information indication method, comprising:
generating, by a transmit end, a Physical Layer Convergence Protocol Data Unit (PPDU) including radar indication information, wherein the radar indication information is configured to indicate that the PPDU is used for radar testing, the radar indication information is located at a MAC layer in the PPDU, and the radar indication information comprises a Type field with a value of 11 and a Subtype field with a value of any one of 0010, 0011, 0100, 0101, 0110, 0111, 1000, 1001, 1010, 1011, 1100, 1101, 1110, or 1111; and transmitting the PPDU to a receiving device, wherein the receiving device is configured with a monitoring function which monitors a channel for data communication from the transmit end, wherein the PPDU specifies to the receiving device to turn off the monitoring function for a period of time specified by the PPDU, to thereby reduce power consumption of the receiving device.

2. An information indication apparatus, comprising:
a memory storing program instructions; and
at least one processor coupled to the memory, the at least one processor executing the instructions to:
generate a Physical Layer Convergence Protocol Data Unit (PPDU), the PPDU including radar indication information, wherein the radar indication information is configured to indicate that the PPDU is used for radar testing, the radar indication information is located in a PHY header in the PPDU, and the radar indication information comprises a Turnaround field with a value of 0 and a Scrambler Initialization field with a value of any one of 1010, 1011, 1000, 1001, 1100, 1101, 1110, 1111, 101R, 100R, 10R1, 10R0, 111R, 110R, 11R0, or 11R0, where R represents a reserved bit; and
transmit the PPDU to a receiving device, wherein the receiving device is configured with a monitoring function which monitors a channel for data communication from the transmit end, wherein the PPDU specifies to the receiving device to turn off the monitoring function for a period of time specified by the PPDU to thereby reduce power consumption of the receiving device.

3. A non-transitory computer readable storage medium comprising:
program instructions that when run cause the following operations to be performed:
generating a Physical Layer Convergence Protocol Data Unit (PPDU) including radar indication information configured to indicate that the PPDU is used for radar testing, the radar indication information is located in a PHY header in the PPDU, and the radar indication information comprises a Turnaround field with a value of 0 and a Scrambler Initialization field with a value of any one of 1010, 1011, 1000, 1001, 1100, 1101, 1110, 1111, 101R, 100R, 10R1, 10R0, 111R, 110R, 11R0, or 11R0, where R represents a reserved bit; and
transmitting the PPDU to a receiving device configured with a monitoring function which monitors a channel for data communication from the transmit end, wherein the PPDU specifies to the receiving device to turn off the monitoring function for a period of time specified by the PPDU, to thereby reduce power consumption of the receiving device.

* * * * *